United States Patent [19]
Bondi

[11] Patent Number: 5,710,885
[45] Date of Patent: Jan. 20, 1998

[54] NETWORK MANAGEMENT SYSTEM WITH IMPROVED NODE DISCOVERY AND MONITORING

[75] Inventor: Andre B. Bondi, Red Bank, N.J.

[73] Assignee: NCR Corporation, Dayton, Ohio

[21] Appl. No.: 565,180

[22] Filed: Nov. 28, 1995

[51] Int. Cl.$^6$ ............................................. G06F 17/00
[52] U.S. Cl. .................................................. 395/200.54
[58] Field of Search ............................ 395/200.11, 182.02, 395/200.54; 364/514 R, 514 B, 551.01; 370/241, 242, 248; 340/825.07, 825.08

[56] References Cited

U.S. PATENT DOCUMENTS

| | | | |
|---|---|---|---|
| 5,031,089 | 7/1991 | Liu et al. | 364/200 |
| 5,446,680 | 8/1995 | Sekiya et al. | 364/551.01 |
| 5,475,813 | 12/1995 | Ciesiak et al. | 395/182.02 |
| 5,539,883 | 7/1996 | Allon et al. | 395/200.11 |
| 5,559,955 | 9/1996 | Dev et al. | 395/182.02 |
| 5,561,769 | 10/1996 | Kumar et al. | 395/200.11 |
| 5,627,766 | 5/1997 | Beaven | 364/551.01 |

*Primary Examiner*—Ellis B. Ramirez
*Attorney, Agent, or Firm*—Gerard M. Wissing

[57] ABSTRACT

A method and system for monitoring nodes in a network having at least one network management station and a plurality of nodes is provided. Initially, polling messages are sent from the network management station to the plurality of nodes. Preferably, the polling messages are sent in a sequence whose emission is regulated at a predetermined rate. As the polling messages are sent, an unacknowledged poll table is updated with the appropriate information indicating that a set of nodes have been sent a polling message. The unacknowledged poll table is preferably indexed by an IP address of each node and is indexed by the time of the next scheduled timeout associated with each node. This method allows an arbitrary number of unacknowledged polls to be outstanding at any instant. Once the polling messages are sent and the queue is updated, the network management station then determines if a node has failed. That is, once the polling messages are sent and the queue is updated, the method verifies whether an acknowledgement is received from each of the managed nodes within a predetermined timeout period. If an acknowledgement is not received, another polling message is sent and the network management station determines if the polling message has been acknowledged after a predetermined timeout period has elapsed. This process is repeated for each node on the outstanding poll list until a predetermined number of polling messages are sent to the same target node. When the network management station sends out the last of the predetermined number of polling messages and has waited for the associated time-out period to expire, then the target node is determined to have failed.

15 Claims, 7 Drawing Sheets

NETWORK MANAGEMENT SYSTEM WITH IMPROVED NODE DISCOVERY AND MONITORING

BACKGROUND

1. Field of the Invention

The present invention relates to network management station and more particularly to a network management station which reduces the elapsed time in which a network's topology is discovered and updated.

2. Description of the Related Art

Large communication infrastructures, known as internets, are composed of wide and local area networks and consist of end-systems, intermediate systems and media devices. Communication between nodes on the networks is governed by communication protocols, such as the TCP/IP protocol. The end-systems include mainframes, workstations, printers and terminal servers. Intermediate systems typically include routers used to connect the networks together. The media devices, such as bridges, hubs and multiplexors, provide communication links between different end-systems in the network. In each network of an internet, the various end systems, intermediate systems and media devices are typically manufactured by many different vendors and to manage these multi-vendor networks requires standardized network management protocols.

Generally, to support the communication network, network management personnel want to know what nodes are connected to the network, what each node is, e.g., a computer, router, or printer, the status of each node, potential problems with the network, and if possible any corrective measures that can be taken when abnormal status, malfunction, or other notifiable events are detected.

To assist network management personnel in maintaining the operation of the internet, a network management framework was developed to define rules describing management information, a set of managed objects and a management protocol. One such protocol is the simple network management protocol (SNMP).

Network management systems need to interact with existing hardware while minimizing the host processor time needed to perform network management tasks. In network management, the host processor or network management station is known as the network manager. A network manager is typically an end-system, such as a mainframe or workstation, assigned to perform the network managing tasks. More than one end-system may used as a network manager. The network manager is responsible for monitoring the operation of a number of end-systems, intermediate systems and media devices, which are known as managed nodes. The network manager, the corresponding managed nodes and the data links therebetween are known as a subnet. Many different tasks are performed by the network manager. One such task is to initially discover the different nodes, e.g., end-systems, routers and media devices, connected to the network. After discovery, the network manager continuously determines how the network organization has changed. For example, the network manager determines what new nodes are connected to the network. Another task performed after discovery, is to determine which nodes on the network are operational. In other words, the network manager determines which nodes have failed.

Once the nodes on the network are discovered and their status ascertained, the information is stored in a database and network topology maps of the networks and/or subnets can be generated and displayed along with the status of the different nodes along the network to the network management personnel. Topology maps assist the personnel in the trouble shooting of network problems and with the routing of communications along the networks, especially if nodes have failed.

Through the discovery process, the network manager ascertains its internet protocol (IP) address, the range of IP addresses for the subnet components (i.e., the subnet mask), a routing table for a default router and address resolution protocol (ARP) cache tables from known and previously unknown nodes with SNMP agents. To ascertain the existence of network nodes, the discovery process performs configuration polls of known nodes and retrieves the ARP cache tables from the known nodes, and the routing tables. The network manager then verifies the existence of those nodes listed in these tables that it has not previously recorded in its database.

Examples of network manager systems are the OneVision™ network management station produced by AT&T and the OpenView network manager produced by Hewlett Packard. Currently, these systems discover nodes and verify the existence and status of nodes by sending to each node an internet control message protocol (ICMP) poll and waiting for a response. The ICMP poll is also known as a ping. If no response is received after a specified period of time, the node is determined to be nonoperational or to have failed. The change in status of the node is then reflected by the network management station by, for example, updating the topology map. Instances may occur when the ping is not received by the node, or the node is busy performing another task when the ping is sent. Thus, to verify that a node has actually failed, the network manager sends out a sequence of M pings, where M is an arbitrary but preferably a fixed number, such as four. Each successive ping is transmitted if a corresponding acknowledgment is not received during an associated scheduled timeout interval. Preferably, the timeout interval is increased for each successive ping. The sequence of pings terminates either if one of the pings is acknowledged, or if no acknowledgement has been received after the timeout interval associated with the Mth ping has expired. If no response is received to the Mth ping, the node is declared to be nonoperational ("down").

To illustrate, the network management station in the OpenView system sends an ICMP poll (ping) to a node and waits for a response. If no response is received from the first ping within ten seconds a second ping is sent out. If no response is received from the second ping within twenty seconds a third ping is sent out. If no response is received from the third ping within forty seconds a fourth ping is sent out. If no response is received from the fourth ping within eighty seconds the node is declared down. The total time from when the first ping is sent to the determination that the node is down can take about 2.5 minutes.

To prevent an overflow of pings from occurring during, for example, initial discovery, these current systems limit the number of unacknowledged ICMP polls to three nodes or less. To limit the number of unacknowledged polls, the ICMP polls for each managed node are stored in memory (a pending polling queue) of the network management station and subsequently transferred to an active polling queue capable of queuing only three nodes. Thus, in the example of FIG. 1, the queue for node A is in queue 1, the queue for node B is in queue 2, and the queue for node C is in queue 3. The three nodes in the active polling queue are then each polled with an ICMP poll. As a poll is acknowledged or in the event a node is declared down, the queue is cleared and the next in line node is placed in the active polling queue. A ping is then sent to the next in line node.

Using the above queuing configuration, if for example three failed nodes are polled in rapid succession, the status of other nodes cannot be ascertained for at least the next 2.5 minutes, since no more than three nodes may have unacknowledged polls concurrently. Similarly, it may take 5 minutes to diagnose the failure of six nodes in succession. It may take 7.5 minutes to diagnose the failure of nine nodes. As a result, the discovery and/or status polling process performed by the network management station could be substantially delayed, thus increasing the elapsed time used by the network management station to perform network management tasks. Further, the topology map may be delayed in being updated, thus increasing the time to diagnose the problem with the network.

With the increase in size and use of internets, the management of such networks has become increasingly difficult. The resulting increase in the number of nodes increases the possibility of polling several failed nodes in sequence. Currently, a failure of multiple nodes would cause the discovery procedure to be effectively frozen as described above. The present invention provides an alternative technique for verifying the operational status of network nodes to reduce the elapsed time of network discovery and the elapsed time of status polling to rapidly provide network configuration updates which may be displayed on the topology map and assist network management personnel in troubleshooting failures more rapidly.

SUMMARY

A method for monitoring nodes in a network having at least one network management station and a plurality of managed nodes is provided. Initially, a plurality of node identities are arranged in a queue in an order of transmission of polling messages to the nodes. Polling messages are then sent from the network management station to the plurality of managed nodes at various intervals controlled by a rate control mechanism. Preferably, the polling messages are sent in a sequence whose emission is regulated at a predetermined rate. As the polling messages are sent, an unacknowledged poll table is updated with the appropriate information indicating that the plurality of managed nodes have been sent a polling message. The unacknowledged poll table preferably has a first portion that is indexed by a network address of each node for which an unacknowledged poll is pending and a second portion that is indexed by the time of the next scheduled timeout associated with each node for which an unacknowledged poll is pending. Once the polling messages are sent and unacknowledged polls are recorded, the network management station then determines if a node has failed. That is, once the polling messages are sent and the unacknowledged poll table is updated, the method verifies whether an acknowledgement is received from each of the nodes within a predetermined timeout period. If an acknowledgement is not received, another polling message is sent and the network management station determines if the polling message has been acknowledged within a predetermined timeout period. This process is repeated until a predetermined number of polling messages are sent to the same target node. When the network management station sends out the last of the predetermined number of polling messages and has waited for the associated timeout period to expire, then the target node is determined to have failed and is removed from the unacknowledged poll table and the polling queue.

The present invention also provides a managed network that includes at least one network management station, and a plurality of nodes connected to the network management station. The network management station includes a polling queue for arranging an order of transmission of polling messages from the at least one network management station to the plurality of nodes, and a poll table having a first portion indexed by a network address of each of the plurality of nodes and a second portion indexed by the time of the next scheduled timeout associated with a polling message count. In this configuration, the network management station can send out polling messages to a plurality of nodes concurrently and determine if each of the plurality of nodes has failed after a predetermined number of polling messages have been sent to each node.

Preferably, the network management station determines if a node has failed by determining if a polling message count has reached a predetermined number, and if a timeout period for a particular polling message count has expired. If these events are determined to have occurred then the node is determined to have failed and is removed from the unacknowledged poll table.

BRIEF DESCRIPTION OF THE DRAWINGS

Preferred embodiments of the invention are described hereinbelow with reference to the drawings wherein.

DETAILED DESCRIPTION

The present invention provides a network management method and system which improves the discovery process and the status monitoring process of current network management systems. It should be noted that the following description is based on a communication network using the TCP/IP communication protocol and a network managing framework using the SNMP protocol. However, the invention is applicable to network management environments based on other network configurations using other types of communication and management protocols as well.

As noted above, during node discovery or during node status verification, the network manager sends ICMP polls (pings) to each node identified in, for example, the ARP cache and any known router tables. The node manager then waits for a response from the target node. The response may include information, such as the node IP address, status information regarding the node, the type of node (e.g., computer, router or hub), and the number of interfaces in the node. When a response is received, the node information is stored in an IP topology database. Typically, the decision to manage a node is made by network management personnel or the network management station.

Preferably, the IP topology database consists of a series of tables, each containing specific information regarding the network. For example, a network table contains information associated with each network in the topology. This information may include the type of network, IP address, subnet mass, and the times associated with the creation and modification of the network entry in the table. A segment table contains information associated with each segment (or subnet) in the network topology. This information may include the name of the subnet, number of interfaces connected to the subnet, and the times associated with the creation and modification of the subnet entry in the table. A node table contains information associated with each node in the network topology. The node information may include, for example, the IP network manager, a SNMP system description, the number of interfaces in the node, and times associated with the creation and modification of the node entry in the table. The information stored in the IP topology database is primarily obtained from the discovery process, but may also be entered from network management personnel.

From the IP topology database, an IP topology map can be created. The IP map is a map of the network topology which places the discovered nodes in appropriate subnets, networks, and/or internets depending upon the level of the topology being mapped. In the system of the present invention, the IP map is preferably updated as the status of a node changes. The IP map displays the different nodes using icons or symbols that represent the node from, for example, an SNMP MIB file.

Figure 1:
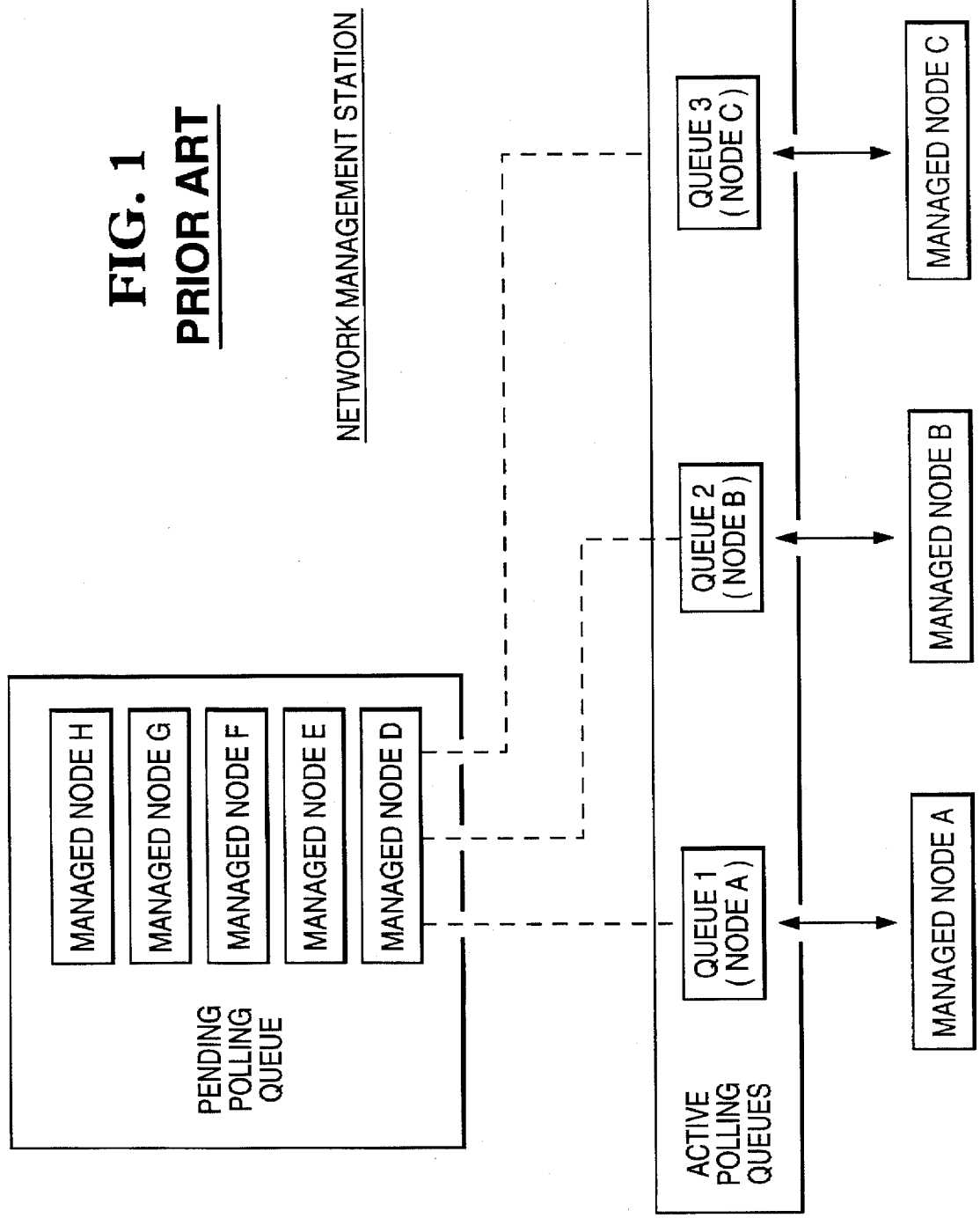
FIG. 1 is a block diagram of a known polling queue for determining the status of nodes.
Figure 2:
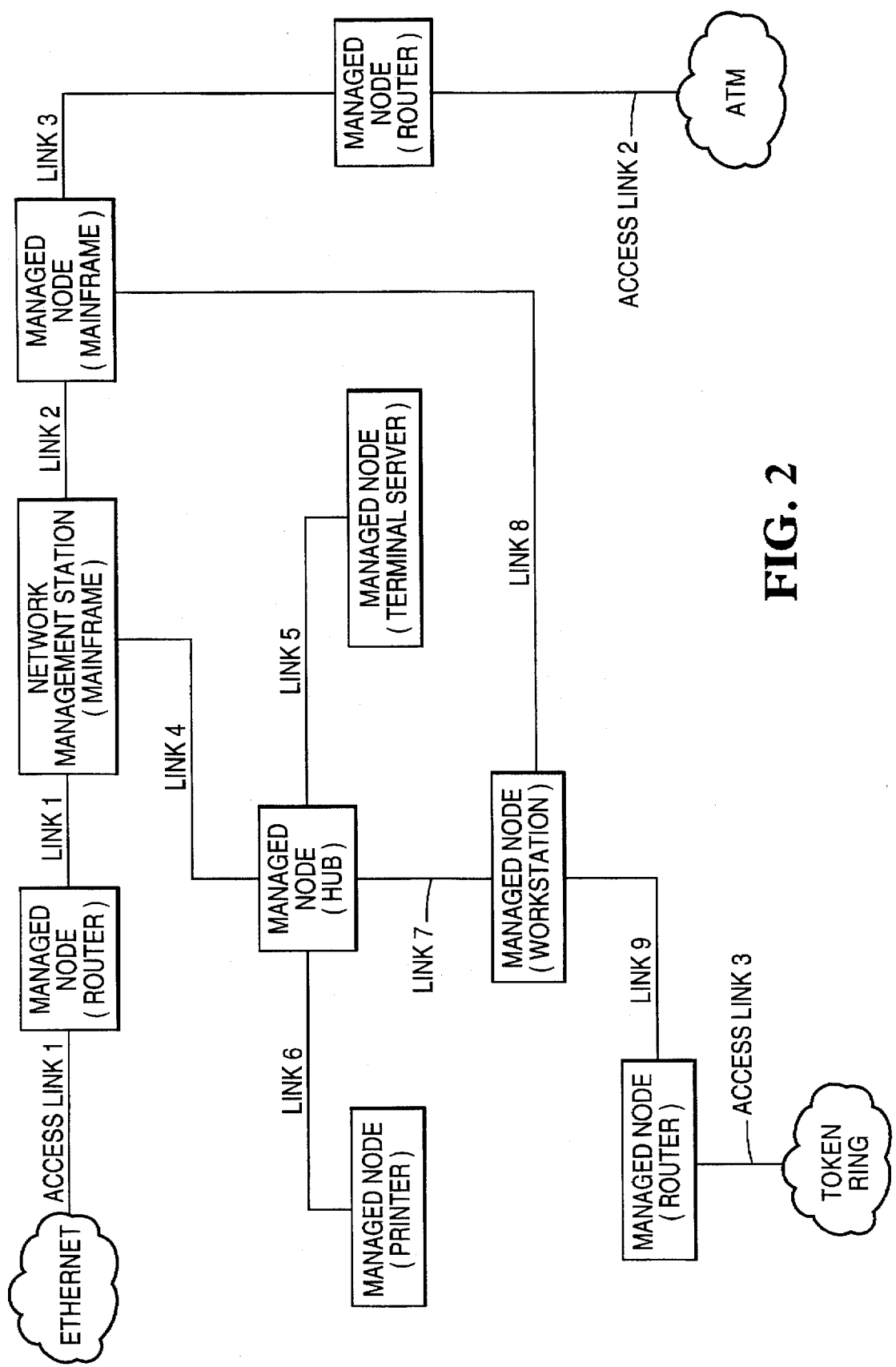
FIG. 2 is a block diagram of an exemplary network topology.

As discussed above, some current network management systems limit the number of unacknowledged pings to three nodes so as to prevent flooding the network with pings. FIG. 1 is a block diagram of the queuing sequence for sending pings to different nodes. As seen in the FIG., queues 1, 2 and 3 store the ping count for nodes A, B and C respectively. The queues are not cleared until the ping is acknowledged or when the time for each ping expires, i.e., a timeout occurs for the Mth ping, and the node is declared to have failed. Thus, a ping cannot be sent to node D until one of the queues is cleared.

The network manager according to the present invention provides a status poll transmission queue which speeds the processing of acknowledgements by storing unacknowledged pings in an ordered data table of arbitrary size indexed by the IP address of each target node. The size of the data table may be fixed or it may vary. To speed the management of timeouts, unacknowledged pings are also stored in an ordered data table indexed by the time by which a timeout is scheduled to occur for a particular ping. Each record in each data table contains a pointer to a corresponding record in the other table to facilitate rapid removal of the managed node from the queue in the event a timeout occurs for the Mth ping, or upon receipt of an acknowledgement of the ping, whichever occurs first.

Figure 3:
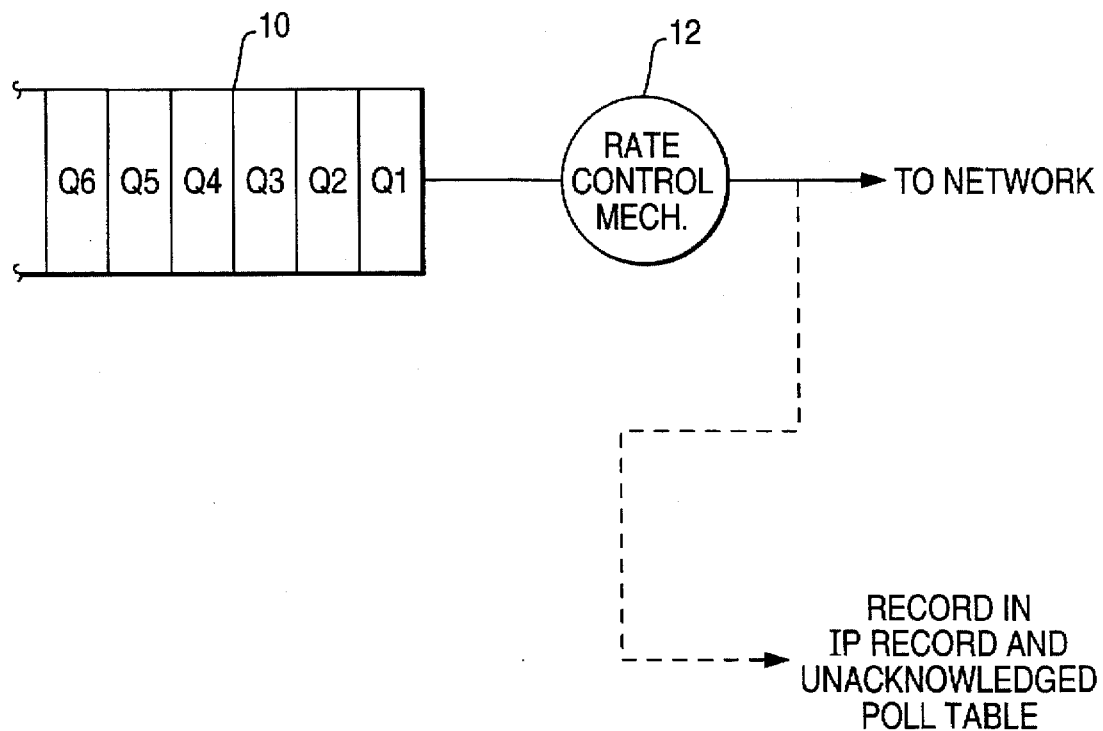
FIG. 3 is a block diagram of the status poll transmission mechanism according to the present invention.
Figure 4:
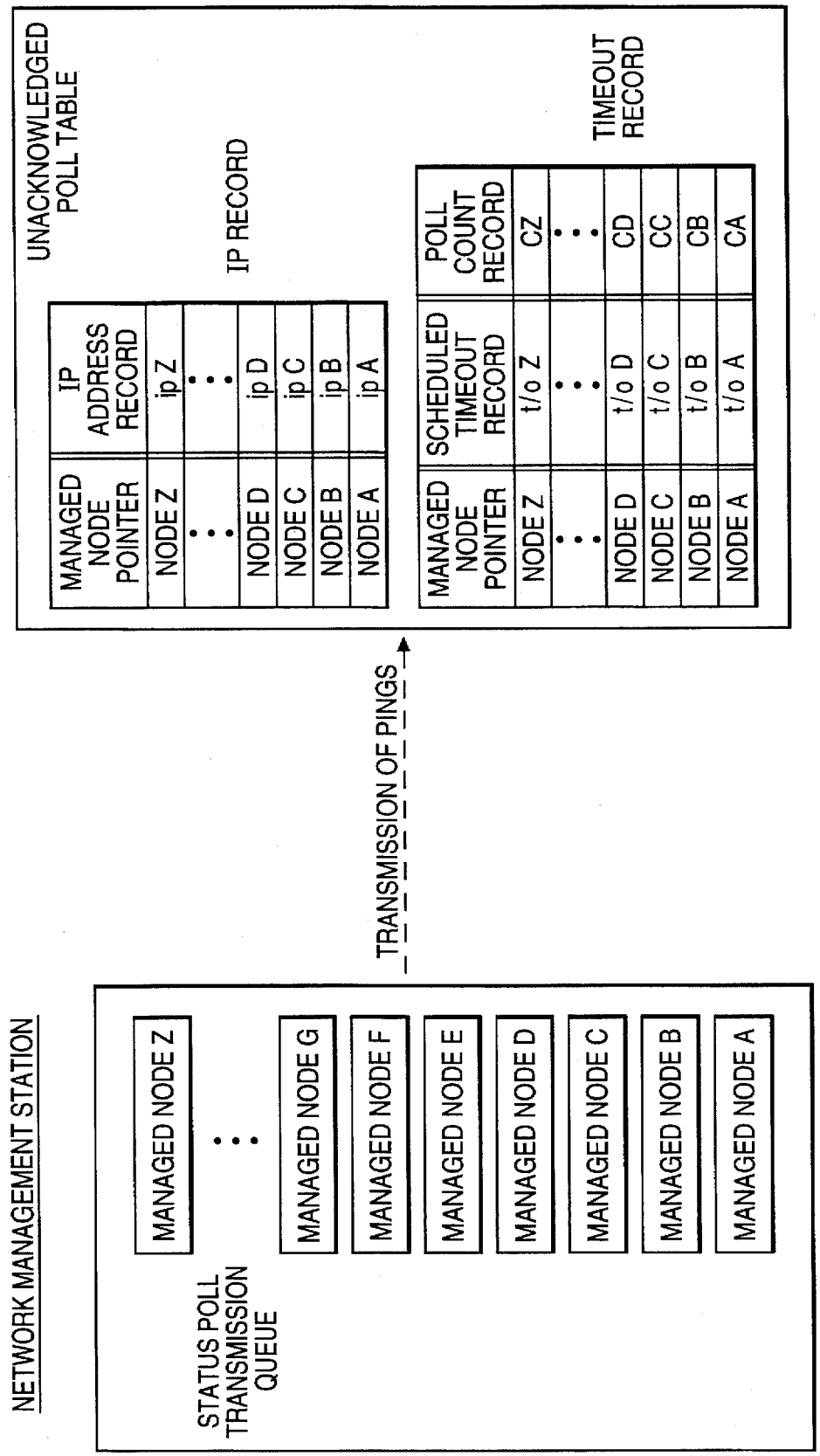
FIG. 4 is a block diagram of the status poll transmission queue according to the present invention.
Figure 5:
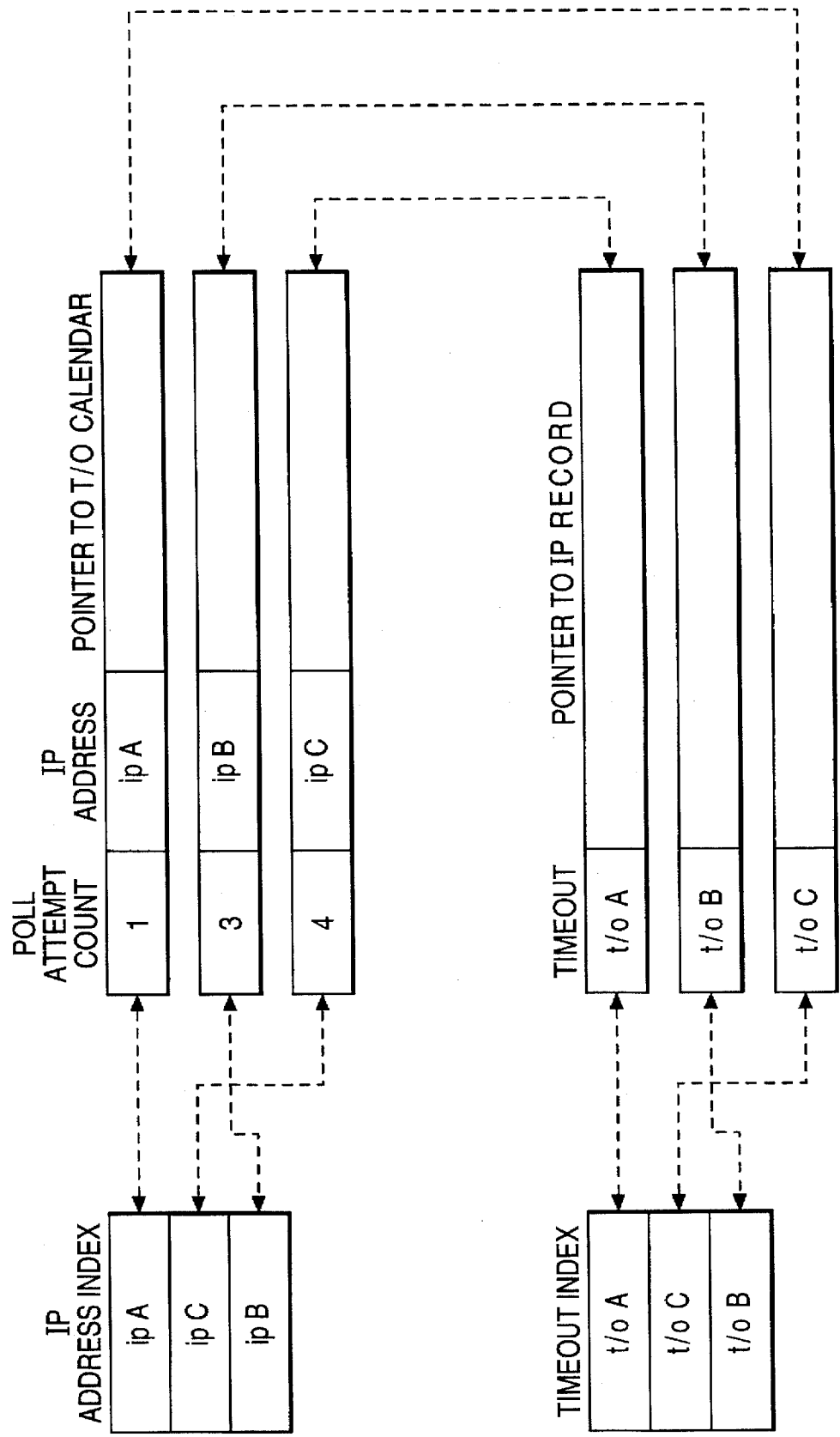
FIG. 5 is a block diagram of an unacknowledged poll table according to the present invention.

FIGS. 3-5 illustrate a status poll transmission mechanism and queue for nodes A-Z, where A-Z represent the identity of each node assigned to the node manager. The status poll transmission queue 10 identifies the nodes which are scheduled to be polled. The status poll transmission queue 10 stores the node identity of the nodes which are awaiting transmission of a poll, and is preferably a FIFO (first in first out) queue or a FCFS (first come first serve) queue. However, other types of queues may be utilized, e.g., a LCFS (last come first serve) queue. A queue might also be ordered by some attribute of the objects waiting in it, such as priority class or node type. A rate control mechanism 12 controls the rate at which the pings are sent on the network to the nodes. As the pings are sent, records of the transmission of the pings are stored in an unacknowledged poll table, seen in FIGS. 4 and 5. As noted, the unacknowledged poll table consists of two data records (an IP record and a timeout record) that are configured to allow an arbitrary number nodes to be polled concurrently without receiving an acknowledgement. This configuration allows many status polls to be outstanding (unacknowledged) at one time. The rate control mechanism 12 prevents the network from being flooded with pings. Combining the utilization of the unacknowledged poll table configuration with the rate control mechanism 12 allows the network to be discovered rapidly even when status polls are unacknowledged for long periods of time. As seen in FIG. 5, the IP record is indexed by the IP address of the target nodes, and the timeout record is indexed by the scheduled timeout for the particular ping being transmitted. The timeout record also includes a ping count record. The scheduled timeout is the time period between successive pings targeted at a particular node. The ping count record represents an arbitrary number of pings that have been sent to the target node before the node is determined to have failed. The maximum ping count may be set by network management personnel or, more usually, by the designer of a network management system. Various factors, such as the acknowledgement return time and the probability of packet loss, are considered when determining the ping count. The acknowledgement return time is the time it takes for the acknowledgement to be received by the network management station.

The scheduled timeout may be set to a fixed, predetermined period of time between each ping. Preferably, the scheduled timeout between pings varies depending upon the ping count. For example, in a configuration where the ping count is four, the scheduled timeout between a first ping and a second ping may be set to about ten seconds, the timeout between the second ping and a third ping may be set to about twenty seconds, the timeout between the third ping and a fourth ping may be set to about forty seconds, and the time between the forth ping and the declaration of a failed node may be set to about eighty seconds.

Figure 6:
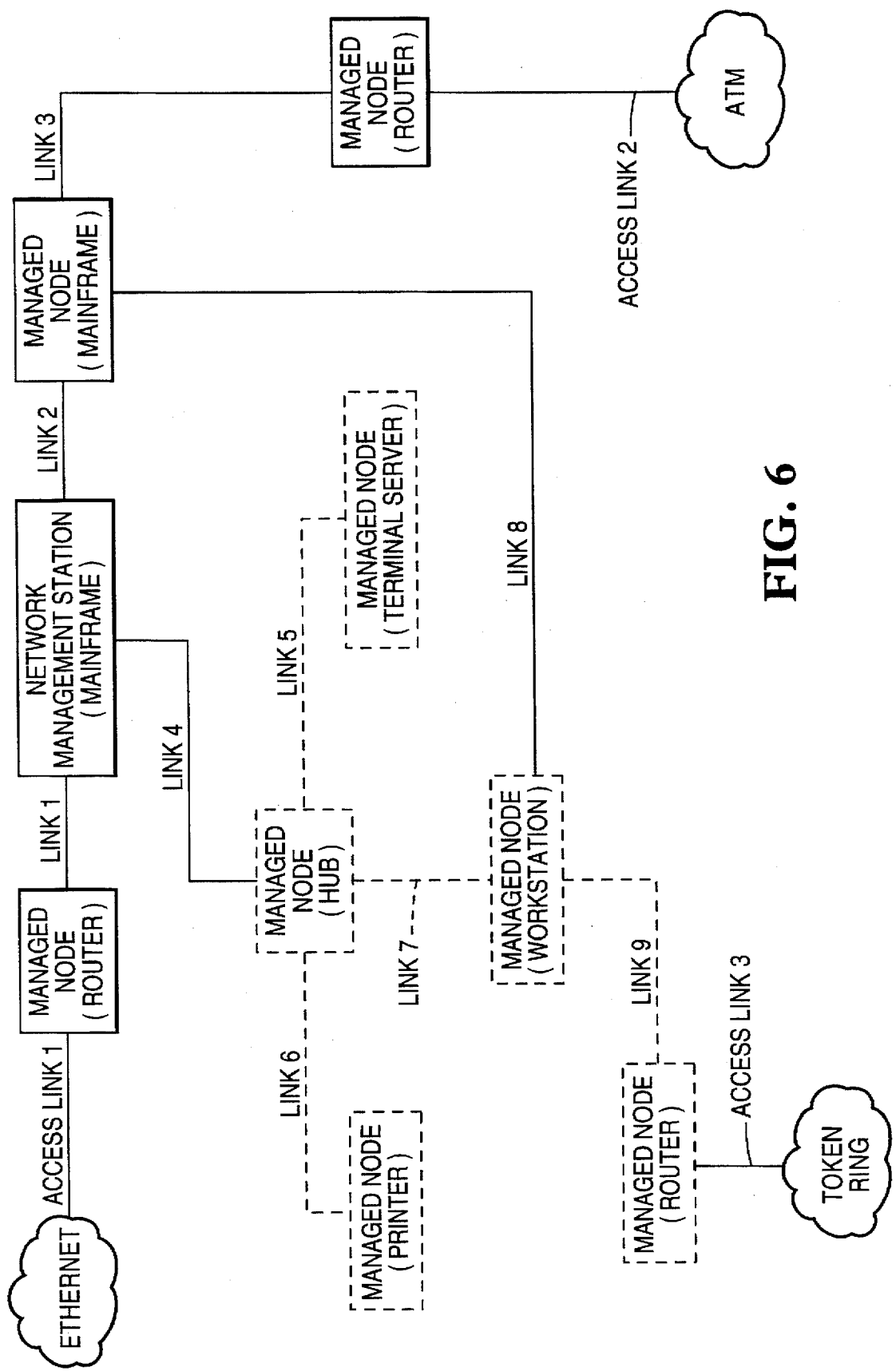
FIG. 6 is a block diagram of the exemplary network topology of FIG. 2, illustrating a failed managed node and other nodes and links affected by the failed node.

Once a prescribed sequence of timeouts has been recorded by the network management station, the node is declared to have failed and the change in status of the network is stored in the IP topology database and reflected in the IP map. FIG. 6 illustrates an exemplary network topology map wherein the hub and its associated managed nodes were determined to have failed to acknowledge the pings.

During the discovery process the IP addresses of new nodes arrive in bulk on retrieved list (ARP cache) causing status polling requests (pings) of previously unknown nodes to be generated in bursts. To prevent the consequent pings messages from flooding the network, the system of the present invention regulates the transmission of the pings. That is, the system of the present invention schedules the pings for transmission in rapid succession at a controlled rate which may be user specified. The controlled rate of ping transmission may be dependent upon various factors including, for example, the current payload on the network, the current spare capacity on the network, and the buffer size in the portion of the kernel of the network management station's operating system that supports network activity. Preferably, the rate is no faster than that at which the kernel (i.e., the portion of the operating system of the network management station that supports process management and some other system functions) can handle acknowledgments. Alternatively, the rate may be automatically adjusted as the ability of the kernel to handle acknowledgments changes. For example, if the spare capacity of the network increases, or if the payload on the network decreases, the rate at which pings may be sent also may be increased. Alternatively, if the spare capacity of the network decreases, or if the payload on the network increases, the rate at which pings may be sent may also be decreased.

As noted, to prevent a flood of pings on the network the pings are scheduled for transmission in rapid succession at the controlled rate using, for example, the rate control mechanism. One method for monitoring the throughput of pings is similar to the "leaky bucket" monitoring algorithm used to provide a sustained throughput for the transmission of ATM cells in an ATM network. A description of the leaky bucket algorithm can be found in "Bandwidth Management: A Congestion Control Strategy for Broadband Pocket Networks-Characterizing the Throughput-burstiness Filter", by A. E. Eckberg, D. T. Luan and D. M. Lucantoni, Computer Networks and ISDN Systems 20 (1990) pp. 415–423, which is incorporated herein by reference. Generally, in the "leaky bucket" algorithm, a set number of pings are transmitted within a specified time frame, and pings in excess of this number can be queued. As noted, the controlled rate can be set by network management personnel or can be automatically be adjusted by the network management station.

Figure 7:
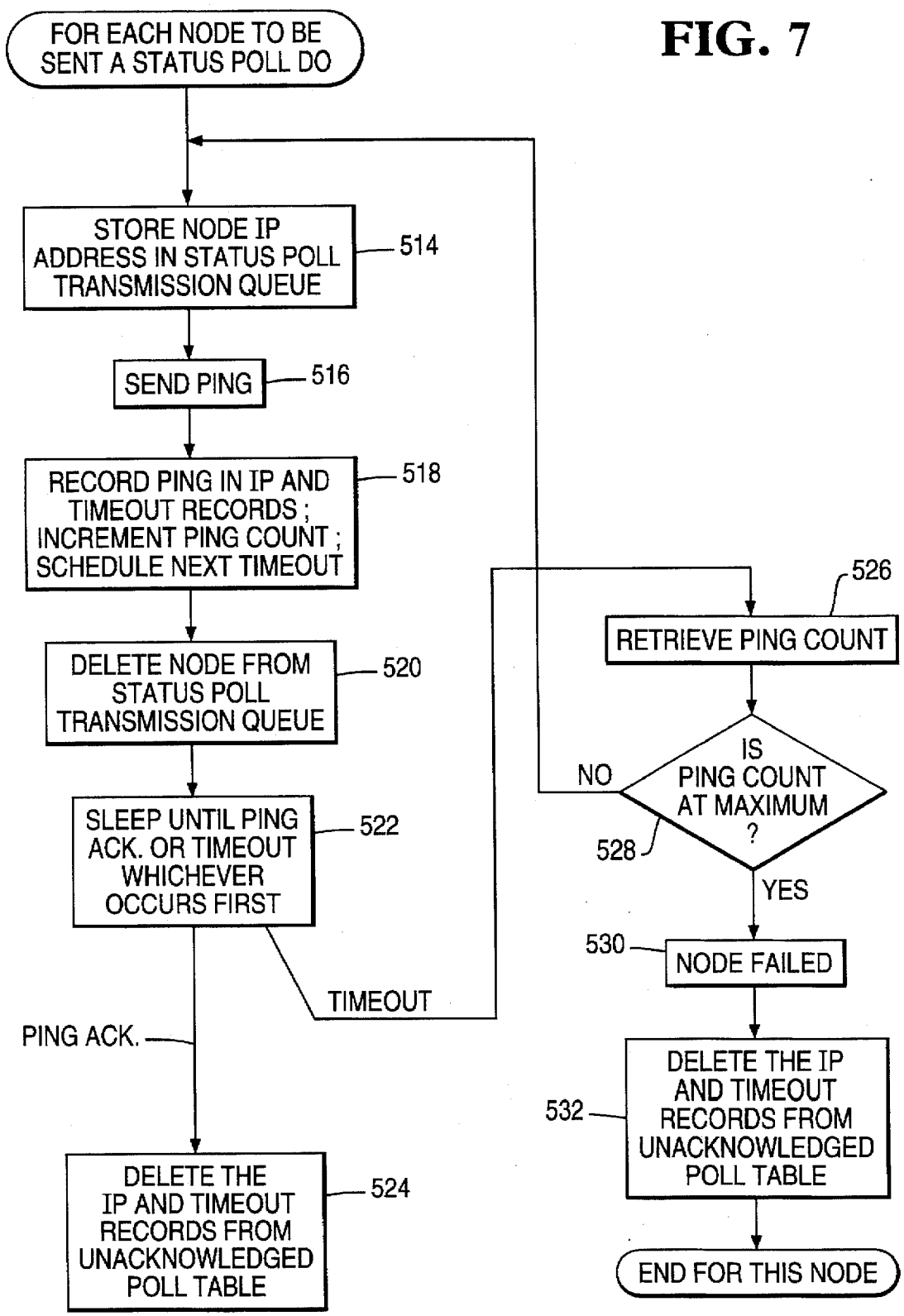
FIG. 7 is a flow diagram for the operation of the network management station during discovery and status verification.

FIG. 7 is a flow diagram of the operation of the network management station during discovery and status verification. Initially, in discovery the network management station receives ARP caches and router tables from various nodes on the network via a configuration poll. The ARP caches and routing tables provide the network management station with, for example, the IP address of nodes along the network. The information obtained from the ARP cache and the routing tables is then stored in an IP topology database. As noted, the determination to manage the node is made by the network management station or network management personnel.

To verify the status of nodes, the IP addresses of the known nodes are stored in, for example, a status poll transmission queue (seen in FIG. 3) which identifies the nodes that are to be polled (step 514). When the network management station is performing status verification tasks, pings are sent to the newly discovered nodes and nodes identified in the status poll transmission queue at the designated IP addresses (step 516). As discussed above, the pings are sent in a controlled sequence at a predetermined rate.

As the pings are sent, the IP address associated with each polled node is stored in IP record of an unacknowledged poll table. Simultaneously, a ping count record in a timeout record of the unacknowledged poll table is incremented by one and the time of the next timeout is scheduled to be the current time plus the time out associated with the new ping count (step 518). Thereafter, the node is deleted from the status poll transmission queue (step 520). Once the ping is sent and the node is deleted from the queue, the system goes into a sleep mode with respect to the particular node until the ping is acknowledged or a corresponding timeout occurs, whichever occurs first (step 522). For each node in the newly retrieved ARP cache that is not known to the network management database, a status poll (ping) is sent in accordance with step 514 above. If the ping has been acknowledged, the network management station preferably deletes the IP record and timeout records in the unacknowledged poll table (step 524).

If the scheduled timeout for a ping occurs first, the network management station retrieves the ping count from the ping count record (step 526) and determines if the ping count matches the predetermined number of counts, i.e., the station determines if the ping count is at the maximum number (step 528). If the ping count does not match the predetermined count number, the IP address for the node is stored in the status poll transmission queue (step 514) and a new ping is sent to the same target node and the network management station repeats the steps, as shown in FIG. 7.

If at step 528 the ping count does match the predetermined count number, then the node is determined to have failed (step 530). Thereafter, the IP topology database is updated with the change in status of the node. The record for that node is then removed from the status poll transmission queue and unacknowledged poll table (step 532).

This process can be performed concurrently for many nodes thus reducing the delay until each managed node is polled and increasing the currency of the IP topology map.

It will be understood that various modifications can be made to the embodiments of the present invention herein without departing from the spirit and scope thereof. For example, various types of network managers and managed nodes may be used in the network topology and various system configurations may be employed. Moreover, the subject matter of the present invention may be applied to network management systems using communications protocols other than IP and network management protocols other than SNMP. Therefore, the above description should not be construed as limiting the invention, but merely as preferred embodiments thereof. Those skilled in the art will envision other modifications within the scope and spirit of the invention as defined by the claims appended hereto.

What is claimed:

1. A method for monitoring nodes in a network having at least one network management station and a plurality of nodes, comprising:

queuing the plurality of nodes in a queue in a network management station so as to arrange an order of transmission of polling messages to the plurality of nodes;

sending a polling message from the network management station to the plurality of managed nodes in sequence at a predetermined rate;

recording in the network management station transmission of the polling messages in a table having a first portion indexed by a network address of each node and a second portion indexed by a timeout associated with a polling message count for each node having an outstanding status poll; and determining if each of the plurality of nodes has failed after a predetermined number of polling messages have been sent to each node.

2. The method according to claim 1, wherein said step of determining if the nodes have failed comprises:

determining if a polling message count has reached the predetermined number; and determining if an elapsed timeout period for a particular polling message count has expired, such that when the polling message for a node is unacknowledged and the polling message count reaches the predetermined number and the timeout has expired the node is determined to have failed.

3. The method according to claim 2, wherein said polling message count is four and the elapsed timeout period is about 2.5 minutes.

4. The method according to claim 1, wherein the polling message is an ICMP polling message.

5. The method according to claim 1, wherein the network address is an IP address.

6. The method according to claim 1, wherein said predetermined number of polling messages is four.

7. A method for monitoring nodes in a network having at least one network management station and a plurality of managed nodes, comprising:

queuing the plurality of nodes on the network in a queue in a network management station so as to arrange an order of transmission of polling messages to the plurality of nodes;

sending a polling message from the network management station to the plurality of nodes on the network in sequence at a predetermined rate;

recording in the network management station transmission of the polling messages in a table having a first portion indexed by a network address of each node and a second portion indexed by the time of the next scheduled timeout associated with a polling message count; and determining if another polling message should be sent to each of the nodes, said step of determining including determining if a polling message count has reached a predetermined number, and determining if the timeout period for a particular polling message count has expired, such that when the polling message for a node is unacknowledged and the polling message count reaches the predetermined number and the timeout has expired the node is determined to have failed.

8. The method according to claim 7, wherein the polling message is an ICMP polling message.

9. The method according to claim 7, wherein said polling message count is four and the elapsed timeout period is about 2.5 minutes.

10. The method according to claim 7, wherein the network address is an IP address.

11. The method according to claim 7, wherein said predetermined number of polling messages is four.

12. A managed network comprising:

at least one network management station; and a plurality of nodes connected to the network management station for data communications therebetween;

wherein the network management station includes a queue for arranging an order of transmission of polling messages from the at least one network management station to the plurality of nodes and a poll table having a first portion indexed by a network address of each of the plurality of nodes and a second portion indexed by a timeout associated with a polling message count; and wherein said network management station determines if each of the plurality of nodes has failed after a predetermined number of polling messages have been sent to each node within an elapsed timeout period.

13. The managed network according to claim 12, wherein the network management station determines if a node has failed by determining if the polling message count has reached a predetermined number, and determining if a timeout period for a particular polling message count has expired, such that when the polling message for a node is unacknowledged and the polling message count reaches the predetermined number and the timeout has expired the node is determined to have failed.

14. The network according to claim 13, wherein said predetermined number is four.

15. The network according to claim 13, wherein said elapsed time is about 2.5 minutes.

* * * * *